United States Patent [19]

Topping et al.

[11] Patent Number: 4,506,448
[45] Date of Patent: Mar. 26, 1985

[54] TEACHING ROBOTS

[75] Inventors: Joseph R. Topping; John D. Jones, both of Preston, England

[73] Assignee: British Aerospace Public Limited Company, London, England

[21] Appl. No.: 436,824

[22] Filed: Oct. 26, 1982

[30] Foreign Application Priority Data

Oct. 27, 1981 [GB] United Kingdom ............... 8132307

[51] Int. Cl.³ .............................................. G01B 3/22
[52] U.S. Cl. ............................. 33/185 R; 33/172 D; 33/191
[58] Field of Search ............... 33/191, 185 R, 174 PC, 33/172 D, 169 C

[56] References Cited

U.S. PATENT DOCUMENTS

| | | | |
|---|---|---|---|
| 3,254,416 | 6/1966 | Eisele | 33/185 R X |
| 3,724,084 | 4/1973 | McNeece | 33/185 R |
| 4,338,723 | 7/1982 | Benjamin | 33/185 R |
| 4,406,069 | 9/1983 | Clement | 33/172 D |

Primary Examiner—William D. Martin, Jr.
Attorney, Agent, or Firm—Cushman, Darby & Cushman

[57] ABSTRACT

A robot 'teaching head' for attachment to the operating arm (8) of a robot and usable for accurately setting the robot arm to respective ones of a sequence of positions, relative to a workpiece or template while 'teaching' the robot to carry out a process involving movement through that sequence. The head comprises a hollow cyclindrical body (1), a sprung slidable sleeve (14) on the body from which there extends a series of attitude setting contact fingers (42) able to make contact with the workpiece and thereby set the attitude of the robot arm, a distance setting contact member (29, 34) for defining a desired distance between the workpiece and robot arm, and a hydraulically driven probe (24, 38) for centering the arm over a desired position on the workpiece. A series of indicator lamps (49) give a visual check of accurate positioning.

7 Claims, 2 Drawing Figures

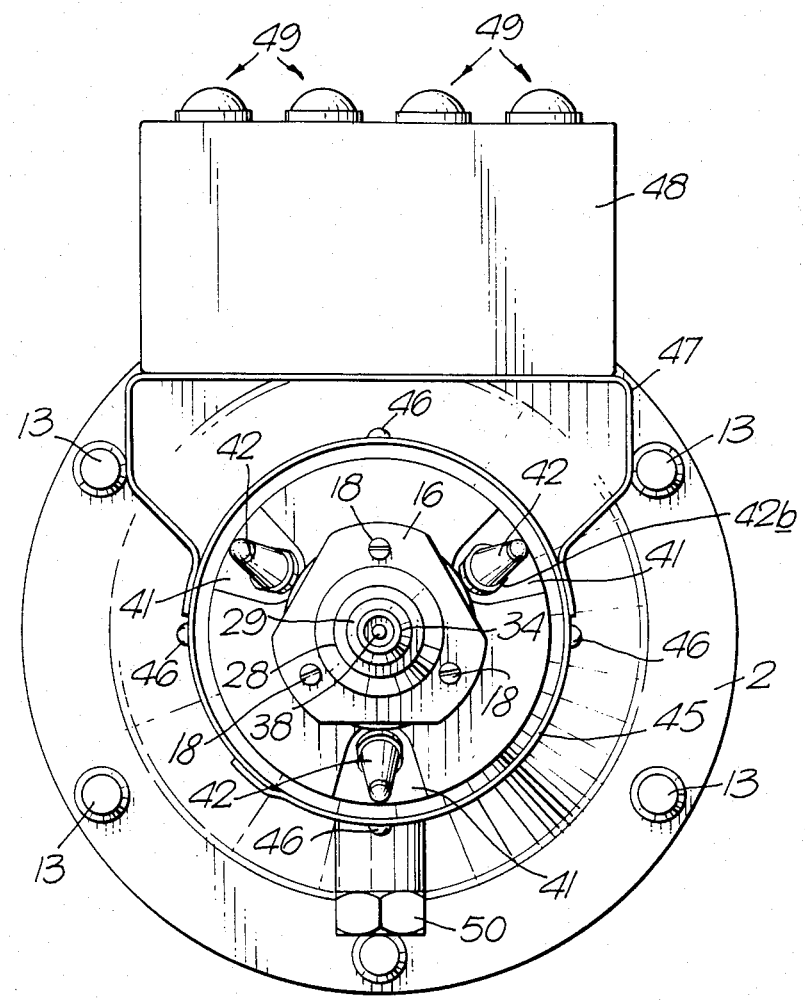

TEACHING ROBOTS

This invention relates to a device for assisting in the process of teaching a robot to carry out some desired operation, for example drilling a series of holes in a workpiece.

The term robot as used herein means a machine having a movable member, known in the art and referred to herein as the "arm", to the end of which there may be fixed a process head, e.g. a drilling head, which actually performs the desired process, and a servomotor arrangement for moving the member and hence also the process head under the control of a computer to carry out the process.

To generate the necessary computer programme, i.e. to "teach" the robot to carry out the desired process, the robot arm can be moved manually or driven by the servomotor arrangement but under manual control to a series of positions relative to a workpiece or template representative of the workpiece, which positions are required to be reproduced during the actual process. For example, the positions may be those at which respective ones of the above-mentioned series of holes are to be drilled. Meanwhile, the computer records the set positions.

The computer might also be programmable by some other means, for example by simply keyboarding in written instructions. However, the manual teaching process is rather convenient. The problem with it is that, particularly for some machining processes, the arm may have to be manoeuvred very accurately to the required positions. Thus taking again the example of drilling a series of holes, for each such hole the robot arm may have to be brought not only to over the correct position but also to a correct attitude with respect to the workpiece and distance therefrom, i.e. so that subsequently the drill bit is advanced into the workpiece from the desired distance and at a desired angle e.g. normal to the workpiece. The correct attitude in particular may be difficult to achieve especially in a case where the workpiece to be drilled is curved in one or more planes.

According to this invention there is provided a teaching head for attachment to the arm of a robot and for assisting in accurately positioning the robot arm relative to a workpiece or workpiece representative template, the teaching head including a plurality of contact members for being brought, in use of the head, into contact with said workpiece or template and being such that, when all of these members are in contact as aforesaid, said arm will then be at a predetermined attitude relative to said workpiece or template.

Advantageously, the teaching head includes indicating means for visibly indicating said contact of each contact member. For example, the indicating means may comprise a series of electrical lamps, each lamp being connected for receiving power from a power supply means via a path including said workpiece or template and a respective one of the contact members.

The contact members may comprise a plurality of elongate fingers coupled to a body of the teaching head such that, when the body is connected to the robot arm, the fingers are spaced around a predetermined axis associated with the robot arm and extend in the same general direction as said axis away from the robot arm, the outer ends of the fingers terminating at a common plane having a predetermined attitude relative to said axis, for example being normal to said axis, so that, when said outer ends are all in contact with said workpiece or template, said axis associated with the robot arm will be at a corresponding predetermined attitude with respect to the workpiece or template. The fingers may be coupled to said body by being fixed to a common member mounted on said body for movement relative thereto towards and away from said robot arm. Advantageously, said body supports a probe lying along said axis and movable therealong, relative to said body, so that the probe tip is movable past said plane. The probe may be coupled to a drive mechanism, for example a pneumatic actuator mounted in said body, for producing said movement. The body may also support a central contact member extending along said axis between said fingers and operable for being brought into contact with the workpiece or template and thereby indicating that the robot arm is at a predetermined distance from the workpiece or template.

For a better understanding of the invention, reference will now be made, by way of example, to the accompanying drawings, in which:

FIG. 2 is an enlarged view in the direction A in FIG. 1 with the workpiece removed.

Figure 1:
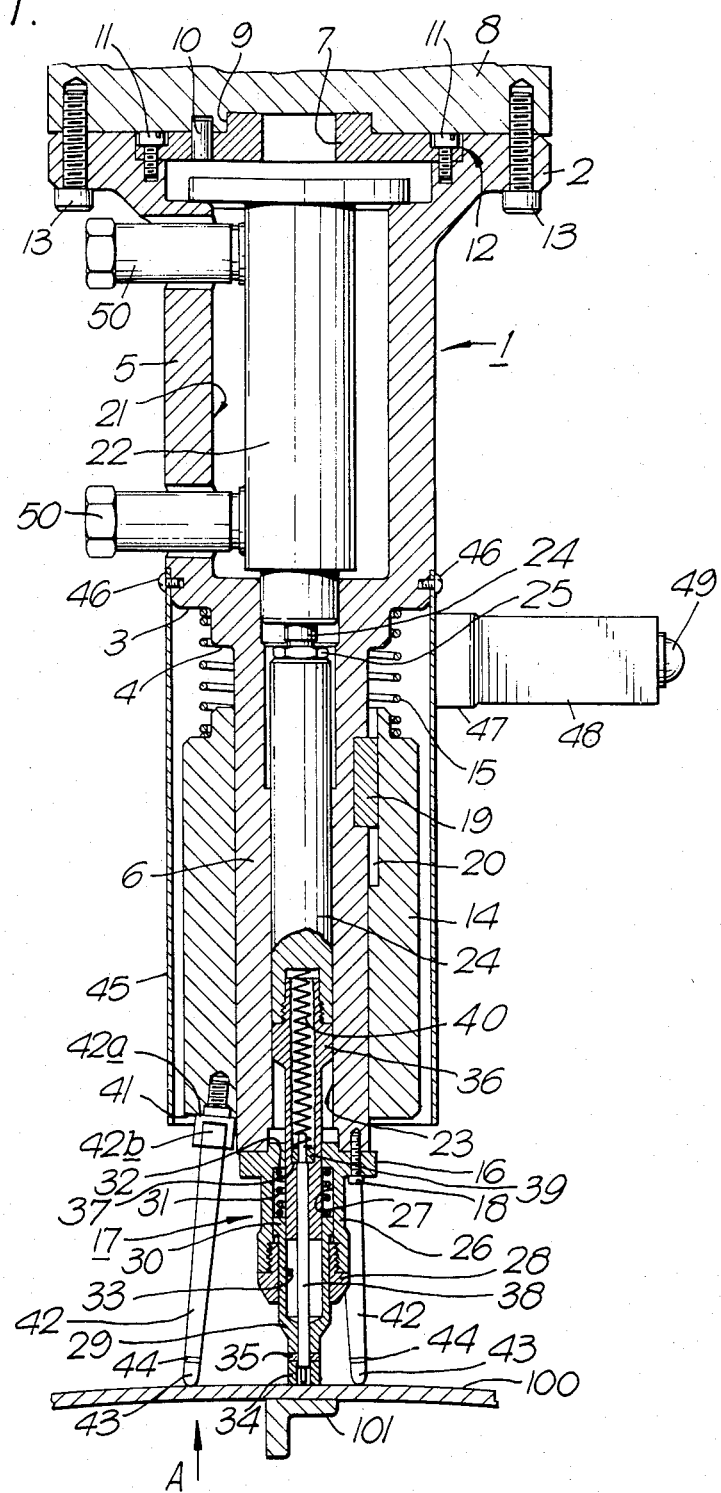
FIG. 1 is a sectioned elevation of a teaching head and part of a workpiece.

The teaching head shown is intended for assisting an operator to teach a Cincinnati Milacron T3 Robot (not shown apart from the end of its arm 8) to drill a series of holes through a curved aircraft skin section 100 and an underlying sub-frame member 101 so that later the skin section can be rivetted to the sub-frame. The teaching process consists of moving the arm 8 of the robot to a series of required positions, i.e. accurately placed over the respective hole positions and at the correct attitude relative to and distance from the skin section, while the computer records the positions. Afterwards, the teaching head is replaced by a drilling head and the computer is caused to move the robot arm to the positions recorded during the teaching process and to control the drilling head to drill each hole. The teaching head assists in achieving the required positions of the arm 8. Accordingly, as will be described in more detail later, its detailed design and dimensions are planned keeping in mind whatever particular drill head is to be used although, again as described later, this is not essential.

It will be appreciated that, although FIG. 1 shows the workpiece lying generally horizontally beneath the teaching head and robot arm, it may be that the workpiece would be set up in a different position say generally vertically and to one side of the robot. The teaching head is usable in whatever relative direction the robot arm and workpiece are to be presented to one another.

The teaching head comprises a generally cylindrical body 1 made of steel and having a flange 2 at one end. About half-way along the body, first and second closely adjacent shoulders 3 and 4 are formed where the diameter of the body is stepped down from that of the body part 5, extending between the flange 2 and the first shoulder 3, to the substantially reduced diameter of the body part 6 extending between the second shoulder 4 and that end of the body which is remote from flange 2.

A flanged collar 7 is located with respect to the body 1 by its flange being fitted into an accurately machined recess in flange 2, the collar being secured to body 1 by screws 11. The collar and hence also the body are then accurately located at the end of the robot arm 8 by a portion of the collar being fitted into a pre-existing locating recess 9 at the end of arm 8 and by a dowel pin 10 engaged in matching holes in the arm end and the collar flange. The body is fixed to the robot arm by screws 13. It will be appreciated, of course, that the illustrated means for locating the body 1 with respect to robot arm 8 is adapted to the pre-existing locating means, i.e. recess 9 and the hole for dowel pin 10, provided on the arm. For a robot provided with different locating means, the teaching head may need to be appropriately modified.

A sleeve 14 is slidably engaged around the reduced-diameter part 6 of the body 1 along with a helical compression spring 15 which acts between the sleeve 14 and the shoulder 3 to urge the sleeve to move towards the end of body part 6 into engagement with abutments defined by radially outwardly extending portions of a flange 16 forming part of a nipple assembly 17 fixed to this end of the body part 6 by screws 18. The sleeve is prevented from rotating with respect to the body part 6 by a key 19 fixed into a matching slot in the body part 6 and engaging a keyway 20 in the internal surface of sleeve 14.

The nipple assembly 17 comprises a body 26 at one end of which there is formed the flange 16 and at the other end of which there opens a threaded portion of a bore 27 through the body 26. A collar 28 is engaged in the threaded portion of bore 27 to form a slide-mounting for a central contact sensor carrier member 29. This sensor carrier member 29 is cylindrical and fits slidably within the hole through collar 28 so that one end thereof lies within the bore 27 while the other end lies beyond the collar 28 outside the body 26. At the inside end of member 29 there is formed an outwardly extending flange 30 which is able to abut collar 28 and hence form a limit for movement of member 29 in the direction out of the body 26. A compression spring 31 within the body 26 acts between flange 30 and a shoulder 32, formed by a stepped reduction in diameter of the bore 27 near the flange end of body 26, to urge the member 29 towards this limit of its movement. Within the member 29 there is a longitudinal hole 33 of which the diameter is stepped down near the outer end of the member 29. At this end of member 29 is the central contact sensor 34 itself, this taking the form of a short tubular section of electrically-conductive metal such as phosphor-bronze. The sensor is fixed by means of an adhesive such as Araldite to a Tufnol insulating washer 35 which is in turn fixed by adhesive to the end of the member 29 such that the holes through washer 35 and sensor 34 are aligned one with another and with the hole 33.

A stepped-diameter axial bore is formed through the body 1 to provide, within the wider-diameter body part 5, a relatively wide bore section 21 in which there is mounted the cylinder assembly 22 of a pneumatic actuator, and to provide within the body part 6 a relatively narrow diameter bore section 23 in which there is slidably received a slide-shaft 24 having a threaded hole (not shown) at one end thereof by which the slide-shaft is adjustably attached to the threaded end of the push-rod 24 of the pneumatic actuator along with a lock-nut 25 for locking the slide-shaft in its set engagement position with respect to the push-rod. There is also a partly-threaded hole at the other end of slide-shaft 24, this hole receiving the threaded end of a slide-shaft tip extension member 36 which extends along into the bore 27 in the nipple assembly body 26 and a short way into the hole 33 through member 29.

The tip extension member 36 is longitudinally drilled to form a wider diameter hole section extending from the end of the member 36 which is engaged with the slide-shaft 24 to a shoulder 37 about two-thirds of the way along member 36 from its slide-shaft end and marking the transition to a narrower diameter hole section which continues on to the other end of member 36. Within this narrower-diameter hole section is slidably fitted a silver-steel probe 38 one end of which lies inside the wider-diameter hole section, is threaded and carries a nut 39. The nut is urged into engagement with shoulder 37 by a helical compression spring 40. Meanwhile the other end of probe 38 extends along through the narrowed down portion of hole 33 in sensor carrier member 29 and the hole in washer 35 to within the hole through the sensor 34. A short tip section extending back from this end of probe 38 is turned down in diameter.

The end of the sleeve 14 nearest the nipple assembly 17 has three shallow recesses 41 machined therein, the recesses being equispaced around the longitudinal axis of the sleeve and each having a threaded hole in the floor thereof. In each of these holes there is engaged a threaded end of a respective elongate, slightly tapering radial contact sensor carrying finger 42 formed, near the threaded end thereof, with a shoulder 42a for abutting the floor of the respective recess 41 and with flats 42b for being engaged by a spanner to tighten the fingers into position during assembly of the head. The floors of the recesses 41 and the threaded holes therein are orientated such that the fingers 42 are inclined slightly, the threaded ends of the fingers being closer to each other and to the longitudinal axis of sleeve 14 than the other ends. At these other ends, the fingers carry the respective radial contact sensors 43, each of which comprises a short dome-ended piece of phosphor-bronze fixed by adhesive to the respective finger 42 via the intermediary of a Tufnol insulating disc 44.

The sleeve 14, body part 6 and spring 15 are enclosed by a simple cylindrical safety cover 45 made of sheet metal and fixed at one end to the body 1 by screws 46. A sheet metal bracket 47 is welded to the cover 45 and carries an electrical circuit box 48 at one face of which there are visible four differently coloured lamps 49.

Two air inlet/exhaust unions 50 are connected to respective ends of the cylinder assembly 22 of the pneumatic actuator and extend through respective apertures formed in the wall of the body part 5 to respective air-hoses (not shown). These air-hoses are led to a conveniently mounted solenoid valve (not shown) which is in turn coupled to an air supply (also not shown). The valve is operable to admit air via one hose and union to drive the piston (not shown) and hence the push-rod 24 of the pneumatic actuator in one direction and to admit air via the other hose and union to drive the piston and push-rod in the other direction.

Respective flexible electrical leads (not shown) are soldered to the sides of the central and radial contact sensors 34 and 43 and led into the circuit box 48, there being sufficient play in the leads to allow for the movements of the sensors relative to the box. Each lead is connected to one terminal of a respective one of the lamps 49. The other terminal of each lamp is connected via a common cable (not shown) to one side of a 24 volt d.c. power supply (not shown), for example a supply which may be made available in the robot or equipment associated therewith, the other side of which supply is grounded to the workpiece 100/101 to be drilled. Thus, when any one of the sensors 34 and 43 contacts the workpiece, the associated lamp is lit. The sensors may be colour coded, with a dab of paint perhaps, to match the respective associated lamps.

As mentioned earlier, the teaching head shown is designed for teaching a robot to drill holes using a particular drilling head which is attached to the robot arm in place of the teaching head after the teaching process has been performed. In particular, the teaching head is so constructed having regard to the dimensions and stroke of the drill head that the tip of the probe 38 is able to represent the cutting tip of the drill bit used in the drill head. Thus, when the push-rod 24 is fully retracted into cylinder assembly 22, while the nut 39 on probe 38 is abutting shoulder 37, the tip of the probe will be at a distance from the end of robot arm 8 which substantially equals the distance between the cutting tip of the drill bit and the end of arm 8 when the drill bit advancing drive mechanism of the drill head is fully retracted. When the sleeve 14 is in engagement with the abutment portions of nipple-assembly flange 16 and the flange 30 of the central contact sensor carrier member 24 is abutting the collar 28, the radial contact sensors 43 are positioned slightly further out from the end of body part 6 than the central contact sensor 34, i.e. so that if the probe is moved in the direction of its longitudinal axis towards a workpiece, the radial contact sensors would contact the workpiece first. Meanwhile, with the pushrod 24 of the pneumatic actuator fully retracted into the cylinder assembly 22, the tip end of the probe 38 lies a predetermined distance back from the end of the central contact sensor. This distance is equal to the distance from the workpiece to which the tip of the drill bit is to be brought by the robot before the drill bit is advanced by the drill head drive mechanism to perform the drilling operation.

In use, the robot arm 8 is moved, manually or under power from the robot servomotors, to bring the teaching head sensors 34 to say about 1O mm. from the workpiece approximately over the position where a hole is to be drilled and with approximately the correct attitude relative to the workpiece. The robot arm and teaching head are then moved or driven slowly towards the workpiece until one or more of the radial contact sensors 43 contact its surface, this being indicated by illumination of the corresponding one(s) of the lamps 49. The pneumatic actuator is now operated so that the narrowed tip of the probe 38 emerges from the hole in the central contact sensor 34. The teaching head is now manoeuvred until the probe tip contacts the point at which a hole is to be drilled in the workpiece and until all three attitude sensors are touching the workpiece surface as indicated by the lighting of the appropriate three lamps. The robot arm and teaching head are now advanced towards the workpiece until the distance setting sensor 34 just contacts the workpiece surface and the remaining lamp 49 is lit, the sleeve 14 and the probe 39 moving back against the pressure of the respective springs 15 and 40 to allow this. The robot arm will now be at the correct attitude with respect to the workpiece, aligned with the point at which a hole is to be drilled and at the correct distance from the workpiece. The computer associated with the robot can now be operated to record this position of the robot arm, and the arm and teaching head then moved on to the next hole position where the sequence is repeated. The teaching process can be done using a pre-drilled template instead of an actual example of the workpiece to be drilled. In this case, the pneumatic actuator can be operated to advance the probe 38 a little way into each template hole to get the robot arm aligned with each required hole position and the arm and teaching head can then be manoeuvred to achieve the correct attitude and distance from the template as before.

It will be appreciated that although the teaching head shown is constructed for use in association with a particular drilling head, the advantage being thereby obtained that the robot computer programme generated during the teaching process is then usable straight away during the actual drilling process, it is usually possible to modify the generated programme, for example via a data input associated with the robot computer, so as to say add or subtract predetermined increments to or from the coordinates of the various positions of arm 8. Thus, by knowing the required adjustments, the teaching head shown could be used to generate an initial programme for a drill head other than that for which the teaching head was designed or even a programme for some process other than drilling. Consequently, of course, it is not essential to design the teaching head for any particular processing head, i.e. the teaching head may simply be made to suitable dimensions and then, knowing the programme adjustments required for a range of different process heads, used in association with any of those heads.

As a further possibility, the teaching head shown could be modified so as to be easily adaptable to different process heads, for example by the provision of a selection of adapters, interchangeable nipple assemblies and the like.

We claim:

1. A device for enabling a robot arm to be accurately positioned relative to a workpiece or template when programming the robot, the device comprising:

a hollow body member having a mounting portion adapted for fixing to the robot arm, a movable member supported by the body member and movable with respect to the body member towards and away from said mounting portion, abutment means fixed to the body member and operable to be engaged by the movable member to limit the extent of said movement of the movable member in the direction away from said mounting portion, spring means engaged between the body member and the movable member and operable to urge the movable member into engagement with the abutment means, a distance-setting member supported by said body member and extending therefrom in said direction away from said mounting portion, the distance-setting member having a hole extending through it in said direction, a plurality of angle-setting finger members fixed to said movable member at respective positions spaced around the distance-setting member and extending from the movable member generally in said direction, a probe pin mounted in said hole in the distance-setting member and movable with respect to the distance-setting member towards and away from said mounting portion of the body member between an extended position in which one end of the probe pin protrudes from the distance-setting member and a retracted position in which said one end of the probe pin lies within the distance setting member, and drive means mounted within the body member and coupled to the probe pin for moving the probe pin between said extended and retracted positions.

2. A device according to claim 1, wherein each of said angle-setting finger members and said distance-setting member comprises an electrical contact portion, and the device comprises a series of electrical lamps which are connected to the contact portions and to electrical power supply means and which are operable to visibly indicate contact between said workpiece or template and said finger members and distance-setting member.

3. A device according to claim 1, wherein said body member is generally cylindrical and elongated said mounting portion is at one end of the body member, said movable member comprises a sleeve engaged around the body member and slidable therealong, said distance-setting member is mounted at the other end of the body member and extends therefrom concentric with the axis of the body member, said angle-setting finger members are spaced around said axis, the ends of the finger-setting members remote from the movable member terminate at a common plane and wherein said probe pin extends from the distance-setting member to beyond said plane when the probe pin is in its extended position.

4. A device according to claim 1, wherein said distance-setting member is supported by said body member for movement with respect to the body member towards and away from the said mounting portion, and wherein the device comprises further abutment means fixed with respect to the body member and operable to be engaged by the distance-setting member and to limit the extent of said movement of the distance-setting member in the direction away from said mounting portion, and further spring means engaged with said distance-setting member and operable to urge the distance-setting member into said engagement with the further abutment means.

5. A device according to claim 1, wherein said drive means comprises a cylinder fixed within the body member, piston means slidably mounted within the cylinder, connecting rod means connected to the piston means and coupled to said probe pin, and duct means coupled to said cylinder for admitting pressurized fluid to the cylinder to drive the piston in one and the other direction within the cylinder and thereby to move the probe pin between said extended and retracted positions.

6. A device according to claim 1, wherein said mounting portion takes the form of a flange having holes therein for receiving screws to fix the flange to the robot arms.

7. A device according to claim 1, wherein said finger-members are splayed outwardly with respect to the distance-setting member.

* * * * *